(12) United States Patent
Ogg et al.

(10) Patent No.: US 8,808,144 B2
(45) Date of Patent: Aug. 19, 2014

(54) AUDIO PACING DEVICE

(71) Applicant: Koninklijke Philips N.V., Eindhoven (NL)

(72) Inventors: Felix Henric Govert Ogg, Eindhoven (NL); David Peter Louis Simons, Bolton, MA (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/079,731

(22) Filed: Nov. 14, 2013

(65) Prior Publication Data

US 2014/0072128 A1    Mar. 13, 2014

Related U.S. Application Data

(63) Continuation of application No. 10/598,078, filed as application No. PCT/IB2005/050587 on Feb. 16, 2005, now Pat. No. 8,608,621.

(60) Provisional application No. 60/546,077, filed on Feb. 19, 2004.

(51) Int. Cl.
*A63B 24/00* (2006.01)
(52) U.S. Cl.
USPC ............. 482/3; 482/1; 482/8; 482/9; 482/901
(58) Field of Classification Search
USPC .......... 482/1–9, 148, 900–902; 434/236, 247, 434/250, 319; 600/519
See application file for complete search history.

(56) References Cited

U.S. PATENT DOCUMENTS

| 3,863,626 | A |   | 2/1975  | Huber           |         |
|-----------|---|---|---------|-----------------|---------|
| 4,566,461 | A |   | 1/1986  | Lubell et al.   |         |
| 4,776,323 | A |   | 10/1988 | Spector         |         |
| 4,788,983 | A |   | 12/1988 | Brink et al.    |         |
| 5,215,468 | A | * | 6/1993  | Lauffer et al.  | 434/236 |
| 5,267,942 | A |   | 12/1993 | Saperston       |         |
| 5,314,389 | A |   | 5/1994  | Dotan           |         |
| 5,527,239 | A |   | 6/1996  | Abbondanza      |         |
| 5,577,510 | A |   | 11/1996 | Chittum et al.  |         |
| 5,810,737 | A |   | 9/1998  | Dardik          |         |
| 5,986,200 | A |   | 11/1999 | Curtin          |         |
| 6,013,007 | A |   | 1/2000  | Root et al.     |         |
| 6,135,951 | A |   | 10/2000 | Richardson et al.|        |
| 6,163,718 | A |   | 12/2000 | Fabrizio        |         |

(Continued)

FOREIGN PATENT DOCUMENTS

JP      10063265 A      3/1998
JP    2001299980 A     10/2001

(Continued)

*Primary Examiner* — Glenn Richman

(57) ABSTRACT

There is provided a audio pacing device including a sensing unit, such as heart rate monitoring unit, to obtain a parameter, such as heart-beat rate (pulse), of a user in physical exercise, a memory to store a plurality of audio signals having predetermined tempo indications (e.g. beats per minute values); and a processing unit configured to (1) determine whether the intensity of the parameter of the user should be increased, decreased or maintained by using the parameter of the user from the heart rate monitor and a predetermined reference value, and (2) dynamically select and render an audio signal having (or adjusted to have) an audio-tempo that enables the user to accordingly increase, decrease or maintain exercise intensity, respectively.

21 Claims, 2 Drawing Sheets

(56) References Cited

U.S. PATENT DOCUMENTS

| | | |
|---|---|---|
| 6,230,047 B1 | 5/2001 | Mc Hugh |
| 6,345,197 B1 | 2/2002 | Fabrizio |
| 6,572,511 B1 | 6/2003 | Volpe |
| 6,634,992 B1 | 10/2003 | Ogawa |
| 6,672,991 B2 | 1/2004 | O'Malley |
| 6,736,759 B1 | 5/2004 | Stubbs et al. |
| 6,790,178 B1 | 9/2004 | Mault et al. |
| 6,805,656 B2 | 10/2004 | Ogawa |
| 6,808,473 B2 | 10/2004 | Hisano et al. |
| 6,837,827 B1 | 1/2005 | Lee et al. |
| 6,852,068 B2 | 2/2005 | Ogawa |
| 7,076,291 B2 | 7/2006 | Pulkkinen et al. |
| 7,175,601 B2 | 2/2007 | Verjus et al. |
| 7,177,672 B2 | 2/2007 | Nissila |
| 7,207,935 B1 | 4/2007 | Lipo |
| 7,518,054 B2 | 4/2009 | Mc Kinney et al. |
| 2002/0091049 A1 | 7/2002 | Hisano |
| 2002/0115937 A1 | 8/2002 | Song |
| 2004/0224718 A1 | 11/2004 | Chen |
| 2006/0102171 A1 | 5/2006 | Gavish |
| 2006/0112808 A1 | 6/2006 | Kiiskinen et al. |
| 2011/0196603 A1* | 8/2011 | Graham et al. ............... 701/200 |

FOREIGN PATENT DOCUMENTS

| | | |
|---|---|---|
| JP | 2001306071 A | 11/2001 |
| JP | 2002373169 A | 12/2002 |
| JP | 2003108154 A | 4/2003 |
| WO | 03094148 A1 | 11/2003 |
| WO | 2004072767 A2 | 8/2004 |

\* cited by examiner

AUDIO PACING DEVICE

This application claims the benefit or priority of and describes relationships between the following applications: wherein this application is a continuation of U.S. patent application Ser. No. 10/598,078, filed Aug. 17, 2006, which is the National Stage of International Application No. PCT/IB2005/050587, filed Feb. 16, 2005, which claims the priority of U.S. application 60/546,077 filed Feb. 19, 2004, all of which are incorporated herein in whole by reference.

The present invention relates to a device and methods using an audio (music) signal, a parameter of an individual (e.g. pulse rate (heartbeat)), and musical listening devices for audio pacing. More particularly, the present invention relates to a device and method capable of measuring parameter of an individual in physical exercise and selecting an audio signal corresponding to an appropriate beats per minute (BPM) to achieve a particular exercise level or intensity.

Numerous physical exercise programs and, in particular, running or jogging performed by individuals are significantly more effective in a particular range of heart beat rates. The required heart beat rates vary for the individuals with different ages and health factors. Moreover, individual heart beat rates that drop to a specific low level, result in physical exercises that can have only a slight influence on them. Further, individual heart beat rates that go beyond an upper limit level, result in exercises that can have a harmful influence on them. Accordingly, people who start physical exercise programs should exercise in amounts suitable for them according to their physical status.

Heart beat (or pulse rate) analysis devices are used as an exercise amount measurement. They measure the heart beat rate (pulse rate) of an individual in exercise in heart beats per minute, and compare the measured number with a standard table, so that one measures the physical exercise as weak, medium, or strong for oneself. Further, sports literature is available with specific tables for goals such as fat-burning/weight loss, energizing exercise, cardiovascular training or speed training Depending on one's weight, height, body fat percentage, age, gender (etc.) one can find the ideal pulse pace for the goal at hand.

Particularly athletes, who want to track their improvements, and thus stay motivated to follow through, find heartbeat monitoring tools motivating and stimulating. Conventional heart beat analysis devices, such as the Polar™ sportswatch, are known to give audible feedback (e.g. a beep) when the pulse of a user/athlete exceeds a target pulse threshold (upper or lower). It thereby signals the user to adjust the exercise strength accordingly to return to the appropriate training zone or level.

However, such conventional heartbeat analysis devices suffer from a number of limitations. For example, many users find the beeping annoying and as a result are known to turn the beeping off altogether. Further, other athletes use portable music playback devices, such as MP3 players, during exercise routines and cannot hear the beeping.

Further, listening to music while performing physical exercise is very popular. However, a problem of listening to music while exercising is that the music often has a tempo which is out of synchronization with the pace of the person exercising. Modern day pop music is generally supported by a clear drumbeat that can be followed in the pace of a physical exercise. Soldiers march to the beat of a song and in the same way Roman slaves rowed their boats to a drumbeat. Athletes enjoy moving along the beat of music playing, since this helps them in keeping a constant pace. Music is a powerful tool to increase the performance of athletes if they are sensitive to it.

Accordingly, there is a need for an apparatus that enables effective heartbeat analysis and pacing in a non-intrusive and motivating fashion, using a music playback device.

The present invention is directed to a system and method for an audio pacing device which monitors a parameter of user in exercise, such as heart rate, and provides an audio signal that is correlated to an individual's exercise program or routine to achieve a target performance level. The target performance level may imply increasing, decreasing or maintaining a particular exercise level or intensity.

The audio signals are categorized, for example based on their beat per minute (BPM) value. The audio signal categorization can be conducted either by the audio pacing device or by an external device, such as a PC, and then transferred to the audio pacing device. An audio signal is selected having a beat per minute (BPM) corresponding to the target performance level of the parameter of the user (e.g. heart rate). The audio signal comprises an MP3, WAV, AAC or WMA file, and the like, generally containing music.

In accordance with the principles of the present invention an audio pacing device is provided including a sensing unit, for example a heart rate monitoring unit, to obtain a parameter, for example pulse, of a user in physical exercise, a memory to store a plurality of audio signals having predetermined musical tempo, for example, beat per minute values; and a processing unit configured to (1) determine whether the intensity of the parameter of the user should be increased, decreased or maintained by sampling the parameter of the user from the sensing unit and comparing it to a predetermined reference value, and (2) select an audio file having a higher, lower or equal tempo that will make the user speed up, slow down, or maintain the current exercise level or intensity, which will result in an increase, decrease or maintaining of the parameter of the user respectively.

The audio pacing device may further comprise a method of dynamically adjusting the tempo of a selected audio signal by a predetermined amount to enable a parameter of the user to achieve a target value or rate. If the maximal adjustment amount turns out to be insufficient for the user to achieve the target rate, a new audio signal is selected with an appropriate tempo.

The present invention is more fully understood by reference to the following detailed description of a preferred embodiment in combination with the drawings identified below.

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. As used herein the terms "pulse" means a heart-beat rate, "tempo" of an audio signal is, for example in BPM, and "pace" refers to an exercise tempo.

This application is filed concurrently with co-pending U.S. patent application "Audio Interval Training Device", Ser. No. 10/598,074, filed Aug. 17, 2006, for F. H. G. Ogg and D. P. L. Simons, and is incorporated by reference herein.

Figure 1:
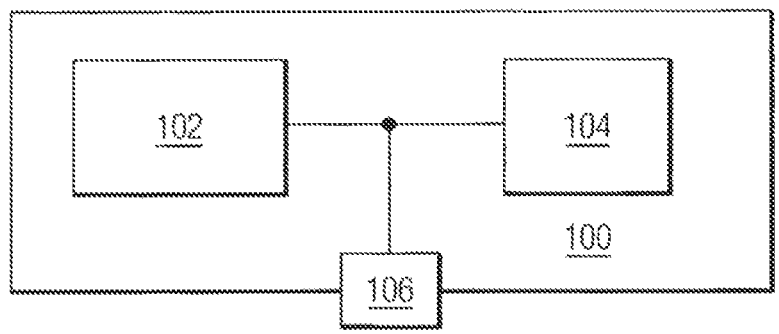
FIG. 1 is a view for showing an audio pacing device according to an embodiment of the present invention.

Referring to the drawings and, in particular, FIG. 1, there is shown an audio pacing device in accordance with the present invention generally represented by reference numeral 100.

As shown in FIG. 1, the present invention includes a processing unit 102, a sensing unit 104 (hereinafter for exemplary purposes referred to as a "heart rate monitor 104") and input/output port 106. The processing unit 102 performs the functions of: (1) receiving and storing parameter information (hereinafter for exemplary purposes referred to as "heart rate") of a user in physical exercise, (2) storing BPM-rated audio signals and (3) and selecting an audio signal with a particular BPM according to user's exercise program. The parameter information of a user in physical exercise may include any measure related to a user physical status or condition, for example, heart rate or a step-rate measurement, speed measurement (in m/s), for example using the electronic speed sensor on sports bicycles, rowing trainers or any other kind of digital fitness equipment, the sit-up speed from a sit-up trainer equipped with a sensor to count the number of sit-ups per minute, similarly a sensor on a strap-on belt on an ankle/wrist/head/waist etc. (for aerobics ground exercises), providing a rating, as well as other measures such as travel speed in general (in m/s), obtained from car-electronics or a GPS device, enabling one to travel at some target cruise-speed by following the music of in-car audio and tap-rates obtained from a tap sensor, for example a drum/tap. The processing unit 102 may also digitize received broadcast signals and encode them according to a particular coding scheme (e.g. MP3, WAV, AAC, MPEG-4 and the like) and BPM-rate received audio signals. Alternatively, as well be apparent to those skilled in the art, the processing unit 102 may also include an integrated heart rate monitor.

The processing unit measures a user's exercise effects by receiving and analyzing heart rate information of a user in physical exercise. For example, data analysis is performed for a change rate of the number of heart beats by time, a suitable exercise course based on a change of the number of heart beats, a proposal of the objective heart beats (a proper exercise amount) based on age, gender, height, and weight, an indication of an exercise improvement degree based on the change of the heart beat rate, a total amount of calories (being) consumed during exercise, what percent of the total consumed calories amount comes from the body fat, and so on. The processing unit 102 may be manufactured in any conventional design or manner including: (1) to be worn on the wrist like a wrist watch in one body with the heart rate monitor 104, (2) to be attached on the front of the user's sporting coat, (3) to be hung around the neck of a user by a string like a stop watch, and (4) to be integrated in a wearable fabric or clothing-type device. In particular, the use of integrated electronic and conductive fibers in various sewn or woven fabrics used as conductive traces, bio-sensors, electrodes, and other wearable electronic devices are well known. For example, in the case of a Wearable Heart Rate Monitor (WHRM) device for general sport applications, the electrodes can be fully made of fabric and can be fully integrated into a garment such as a running top. The electronics though that collect the data from the electrodes and transmit them wirelessly to a watch or similar device are contained in a separate small unit which can be attached onto the garment in such a way that it can make good electrical contact with the electrodes.

The heart rate monitor 104 is connected to the processing unit 102 in a wire, wireless or wearable fabric way, and performs a function of continuously measuring the heart beat rate of a user in physical exercise and transferring the measured values to the processing unit 102. The heart rate monitor can be any conventional unit, for example the Polar$^{TM}$ Sportswatch, by Polar Electronics. Such heart rate monitor 104 is carried on a wrist like a wrist watch.

The input/output port 106 is connected to the processing unit 102 and heart rate monitor for exchanging data, and includes the functions of transferring digitalized music files to the processor 102 and outputting audio signals, selected based on their tempo (e.g. their BPM rating).

Figure 2:
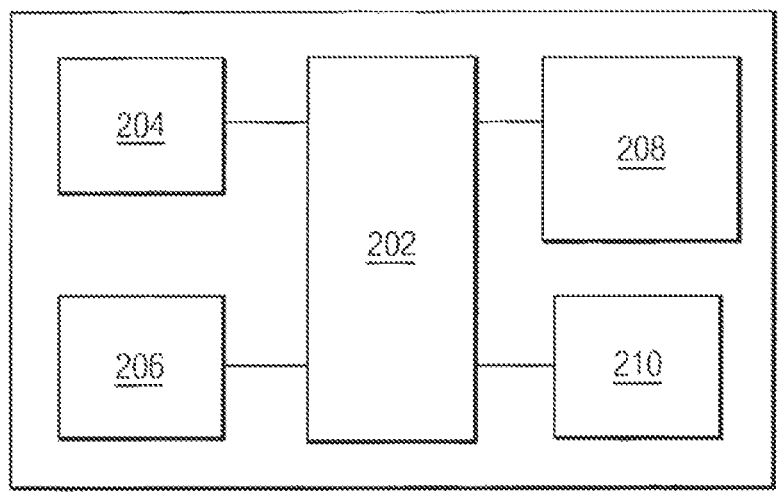
FIG. 2 is a block diagram for showing an internal structure of the processing unit FIG. 1.

FIG. 2 is a component diagram of the processing unit 102 of FIG. 1 according to an embodiment of the present invention.

As shown in FIG. 2, the processing unit according to the present invention has a control unit 202, an output unit 204, a storage unit 206, a heart rate signal receiving unit 208, and an input unit 210. The control unit 202 includes a conventional microcomputer and a digital signal processor (DSP) (not shown). The output unit 204 includes an audio output unit and may include an indication unit (not shown). The parameter receiving unit 208 (hereinafter for exemplary purposes referred to as a "heart rate signal receiving unit 208") receives heart rate information from the heart rate monitor 104 and transfers it to the control unit 202. As indicated above, a conventional heart rate monitor can also be integrated into the processing unit.

Storage unit 206 contains a group of BPM categorized audio signals, for example MP3s. In addition, storage unit 206 may contain programmed exercise routines or target exercise levels, as further described below, which are received using input unit 210.

The BPM categorizing can be performed by the processing unit or off-line and downloaded to the audio pacing device. The BPM categorized audio signals can be input into the storage unit 206 using any conventional manner (e.g. downloaded from a PC, wirelessly transmitted, etc.) A conventional tool that does automatic (off-line) BPM analysis upon audio files to measure the musical tempo, (as well as dynamic (on-line) tempo adjustments, discussed below) is the PCDJ-Red product from Visiosonic. This tool will determine the average BPM of a song to an accuracy of 0.01 BPM (such as 86.56 beats per minute). Once an audio signal is tempo-analyzed, the BPM value it is stored with the audio signal, for example in the header of the audio signal. In particular, in the case of MP3 files, the BPM value is stored in the MP3 file, as an ID3v2 BPM tag, which can be read by other applications subsequently. Thus, for example, MP3s can be downloaded to the audio pacing device that are searched (e.g. on the Internet) for their ID3v2 BPM tag values. If no value for their BPM is available, it is generated by using BPM analysis algorithms in the audio pacing device.

The control unit 202 stores the sampled heart rate (pulse) into a storage unit 206, analyzes the rate received, compares it with a predetermined comparison value (pulse Target) (e.g. target level or programmed exercise program), and selects an audio signal having a tempo (e.g. denoted in a BPM value) corresponding to an appropriate level to increase, decrease or maintain a user's heart rate, and output the selected audio signal using output unit 204. The comparison value may be a predetermined or variable, it may also be re-adjusted at run-time. (i.e. the user may want to slow down, and he decreases his target heart rate accordingly.

The appropriate level to increase or decrease user's heart rate is predetermined by the user or by any other conventional manner. For example, an objective number of heart beats as a reference value range which can evaluate what extent of heart beats corresponds to a high-strength exercise, a medium-strength exercise, or a low-strength exercise. In the same way it may set a range for cardio-vascular, aerobic or an-aerobic exercise. Moreover, established values for heart rates during physical exercise can be used that factor the age, gender, height, weight, etc., of a user. In addition, the processing unit can store (in storage unit 206) programmed training routines, using the above factors, for a user wherein heart rate levels are established. The programmed training routines can be input into the processing unit in any conventional manner. For example, a heartbeat sensor, such as the Polar™ sportswatch, can be manually programmed with a training zone (two heart beat values).

Accordingly, the control unit 202 receives heart rate of a user (an individual in physical exercise) from the heart rate monitor unit 208, compares the received heart rate with the predetermined objective heart rate, and determines an appropriate BPM audio signal to output to help achieve the desired user heart rate. When a particular audio signal, or song/music ends, while the user is in an exercise program, another audio signal with a similar BPM is selected from the store group of audio signals.

The processing device is also enabled to receive input from a user, using the input unit 210, for example a button, during exercise to denote particular audio signals or songs that support the exercise or training. Also, the user can use the input unit 210 to denote favorite audio signals. This in turn will enhance the probability that the particular audio signal will be selected during a later exercise session. For example, once an audio signal is denoted favorite, if an audio signal is needed in the future within a predetermined range (for example +/−10%) of the denoted audio signal's BPM, it will be selected.

In a similar manner, the user can store an indication of the type of exercise, for example, the type of sport (e.g. running, rowing, cycling etc.) along with the denoted audio signal. Thus, the processing device records the most appropriate audio signal for each type of sport or exercise for a user (as presets). This, for example, shortens the time to select a matching BPM audio signal, during a start of an exercise, wherein a user expects the device to play music/song (audio signal) that best fits his exercise. After choosing an initial song, all similar BPM songs in storage are ready for use.

The control unit 202 also performs dynamic (on-line) tempo adjustments of a selected audio signal to pace a user to maintain a desired heart rate. For example, during physical exercise, when a user's heart rate is (slightly) out of the desired range, the control unit 202 adjusts the audio signal's tempo to help direct to the user to the appropriate heart rate. Preferably, the audio signal's tempo is not adjusted to more than about a predetermined amount from a base line (e.g. 10%). For example, the base line is the natural tempo of the music itself. The tempo adjustments based on the heart rate continue constantly during an exercise program. If, with tempo adjusted maximally, the user's heart rate is still outside the desired range, another audio signal with an appropriate BPM rate is selected and rendered to the user.

Pacing by step-speed can also be used to select audio signals, e.g. the dynamic tempo adjustments of a selected audio signal, which times the step-tempo of the user/athlete. Conventional step-speed measurement devices are known and can be further integrated into the processing device 102. The processing unit 102 selects an audio signal and then adjusts its tempo to match the exact running tempo of the user or select another audio signal that has a tempo that matches the step-speed. Moreover, the audio pacing device may be configured to switch modes, such that when the device has found the music (audio signal) that is appropriate for the exercise (e g running), the device starts to pace the user to maintain the current level of exercise intensity from that moment on. The switching modes include pacing by step-speed target or by heart-rate target.

The heart rate receiving unit 208 receives heart rate data from the heart rate monitor 104 in a wire or wireless way. In case of wire, data is received through a certain cable, and, in case of wireless, receptions are carried out by using a wireless signal such as an RF signal and the like.

Figure 3:
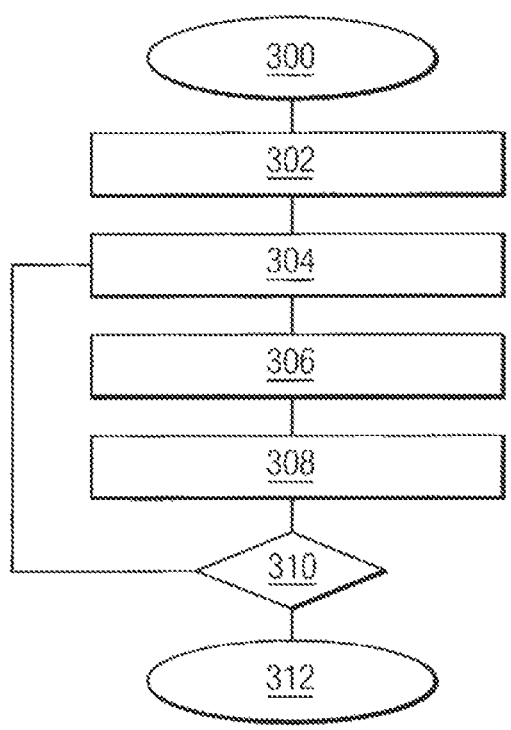
FIG. 3 is a flow chart for showing a process of the audio pacing device of FIG. 1.

FIG. 3 is a flow chart illustrating the operation steps of heart rate audio pacing.

As shown in FIG. 3, the process begins (start 300) with a user (or automatically) selecting an exercise level(s) or program in step 302, by a user using the input/output port 106. The user sets a pulse target. In step 304, the processing unit 102 receives heart rate information from the heart rate monitor and stores it in storage unit 206. The control unit 202 analyzes the received heart rate information and compares it to the selected exercise levels in step 306, and the processing unit 102 selects a medium tempo (e.g. an MP3 file having a BPM value around the average of all BPM values on storage) audio signal, or a favorite audio signal. In particular, the control unit determines the heartbeat rate (pulse) of the user and at what stage or level the user is in the selected exercise program and determines whether the user needs to increase, decrease or maintain the current pace (exercise intensity). In step 308, the control unit 202 selects an audio signal from storage unit 206 in accordance with the determination of step 306 and provides it to the user.

The user is expected to move to the beat of the music. The heart rate monitor continuously samples the heart rate of the user. If after a small period of time has elapsed (determined by the type of exercise or a predetermined time) the user's heart rate is not within a small range of the target pulse, the device will pace the user towards the desired pulse, by either adjusting the tempo of the audio signal being rendered, or by selecting a different audio signal.

For example, if the user's exercise intensity is insufficient for his heart rate to attain the target, the tempo of the audio signal will be increased. As described above, this can be accomplished in two ways. First, by increasing the playing tempo of the current audio signal. This is preferable over the second way: selecting a different audio signal, since it does not interrupt the flow of music. However increasing the tempo with more than about 10% from the natural tempo will not go unnoticed by the user (which may be annoying to the user). Therefore, the device will first try to pace the user by speeding up the tempo of the current audio signal. If the tempo is 110% and the user's heart rate still is below target, the device will select another audio signal. In this case the newly selected audio signal will have a higher BPM value than that of the current audio signal. (The device will thus play more up-tempo music.)

In the same way, the device will monitor the user's heart rate rising above the target heart rate and pace the user to slow down.

A user/athlete following the tempo of her music will eventually attain her target heart rate, and thus perform her exercise at the targeted intensity. At this time, the music tempo may oscillate around the ideal tempo which will go unnoticed by the user/listener. This process continues until STOP or end 312.

In step 310, process determines whether the selected exercise program has ended (end 312) or returns to the step 304.

The preceding and following merely illustrates the principles of the invention. It will thus be appreciated that those skilled in the art will be able to devise various arrangements which, although not explicitly described or shown herein, embody the principles of the invention and are included within its spirit and scope. For example, an inexpensive version of the heart rate audio pacing apparatus may comprise a device without a heart rate monitor (or feedback sensor). The device would feature two buttons: Faster and Slower. When pressed they adjust the pace (again first up to about 10% by speedup, then by selecting another audio signal). Additionally, it is intended that such equivalents include both currently known equivalents as well as equivalents developed in the future, i.e., any elements developed that perform the same function, regardless of structure.

The functions of the various elements shown in FIGS. 1 and 2, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor", "server" or "controller" should not be construed to refer exclusively to hardware capable of executing software, and may implicitly include, without limitation, digital signal processor (DSP) hardware, read-only memory (ROM) for storing software, random access memory (RAM) and non-volatile storage. Other hardware, conventional and/or custom, may also be included.

In the claims hereof any element expressed as a means for performing a specified function is intended to encompass any way of performing that function including, for example, a) a combination of circuit elements which performs that function or b) software in any form, including, downloadable or retrofit software or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

The invention claimed is:

1. An audio pacing device, comprising:
   means for rendering an audio signal having a tempo value,
   a sensing unit to obtain an intensity of a parameter that is representative of a motion of a user;
   a memory to store a plurality of audio signals having respective predetermined tempo values; and
   a processing unit configured to determine whether the intensity of the parameter value should be increased, decreased or maintained depending on the parameter from the sensing unit and a predetermined reference value, wherein the processing unit is configured to either adjust or maintain the tempo of the audio signal being rendered or to select a different audio signal having a higher or lower tempo than the audio signal being rendered depending on the determination.

2. The audio pacing device of claim 1, wherein the parameter is a pulse-rate.

3. The audio pacing device of claim 1, wherein the parameter is a step-rate.

4. The audio pacing device of claim 1, wherein the tempo is a beat per minute value.

5. The audio pacing device of claim 2, wherein the sensing unit is a heart rate monitor.

6. The audio pacing device of claim 3, wherein the sensing unit is a step-rate measurement unit.

7. The audio pacing device of claim 1, wherein the sensing unit and the processing unit are connected wirelessly.

8. The audio pacing device of claim 1, wherein the processing unit is configured to adjust the tempo of a selected audio signal by a predetermined amount.

9. The audio pacing device of claim 1, wherein the predetermined reference value includes reference values selected by a user or a programmed exercise routine.

10. The audio pacing device of claim 1, wherein the audio signals stored in the memory are categorized based on their tempo value.

11. The audio pacing device of claim 1, wherein the predetermined tempo values of the plurality of audio signals are determined either by the audio pacing device, or by an external device and transferred to the audio rate pacing device.

12. The audio pacing device of claim 1, wherein the audio signals are encoded in an MP3, WAV, MPEG-4, WMA, or AAC format.

13. The audio pacing device of claim 1, further including a switch to enable use of the audio pacing device in a first mode using a first sensing unit and a first parameter and a second mode using a second sensing unit and a second parameter.

14. An audio pacing method, comprising the steps of:
   rendering an audio signal having a tempo value;
   receiving a parameter from a sensing unit indicating a motion of a user;
   determining whether the parameter intensity should be increased, decreased or maintained by using the parameter of the user from the sensing unit and a predetermined reference value;
   selecting an audio signal having a tempo that encourages the user to increase, decrease or maintain the intensity of the parameter according to the determination.

15. The audio pacing method of claim 14, further comprising the step of adjusting the tempo of a selected audio signal.

16. The audio pacing method of claim 14, further comprising the step of a user selecting the said predetermined reference value from a group of reference values or a programmed exercise routine.

17. The heart rate audio pacing method of claim 14, wherein the audio signals are encoded in an MP3, WAV, MPEG-4, WMA, or AAC format.

18. The audio pacing method of claim 14, wherein the parameter is a pulse rate.

19. The audio pacing method of claim 14, wherein the parameter is a step-rate.

20. The audio pacing device of claim 14, wherein the sensing unit is a heart rate monitor.

21. The audio pacing device of claim 14, wherein the sensing unit is a step-rate measurement unit.

\* \* \* \* \*